United States Patent
Kuwano

(10) Patent No.: US 8,611,020 B2
(45) Date of Patent: Dec. 17, 2013

(54) PIEZOELECTRIC ACTUATOR, LENS BARREL, AND IMAGING DEVICE

(75) Inventor: Kunihiro Kuwano, Kawasaki (JP)

(73) Assignee: Nikon Corporation, Tokyo (JP)

( * ) Notice: Subject to any disclaimer, the term of this patent is extended or adjusted under 35 U.S.C. 154(b) by 263 days.

(21) Appl. No.: 13/248,525

(22) Filed: Sep. 29, 2011

(65) Prior Publication Data

US 2012/0081803 A1    Apr. 5, 2012

(30) Foreign Application Priority Data

Sep. 30, 2010   (JP) .................................. 2010-220426

(51) Int. Cl.
*G02B 15/14*   (2006.01)

(52) U.S. Cl.
USPC .......................................................... 359/694

(58) Field of Classification Search
USPC .................. 359/694–704, 811–824
See application file for complete search history.

(56) References Cited

U.S. PATENT DOCUMENTS

2002/0014814 A1* 2/2002 Yasuda .......................... 310/328
2011/0109968 A1* 5/2011 Park et al. ...................... 359/554

FOREIGN PATENT DOCUMENTS

| JP | A-1-145168 | 6/1989 |
| JP | A-4-331482 | 11/1992 |
| JP | A-5-203772 | 8/1993 |
| JP | A-9-271183 | 10/1997 |
| JP | A-2000-324863 | 11/2000 |
| JP | A-2003-289682 | 10/2003 |
| JP | A-2006-187097 | 7/2006 |
| JP | A-2007-236138 | 9/2007 |
| JP | A-2010-172128 | 8/2010 |

OTHER PUBLICATIONS

Office Action issued in Japanese Patent Application No. 2010-220426 dated Apr. 9, 2013 (with translation).
Office Action issued in Japanese Patent Application No. 2010-220426 dated Aug. 28, 2012 (with translation).

* cited by examiner

*Primary Examiner* — James Jones
(74) *Attorney, Agent, or Firm* — Oliff & Berridge, PLC

(57) ABSTRACT

A piezoelectric actuator includes a first piezoelectric element that performs thickness-shear vibration in a first direction, a first member that is driven by the first piezoelectric element and that vibrates in the first direction, a second piezoelectric element that is supported by the first member and that performs thickness-shear vibration in a second direction, a second member that is driven by the second piezoelectric element and that vibrates in the second direction, a pressurizing section that generates a pressure between the second member and a driving target member driven by the second member. The pressurizing section includes a third piezoelectric element that changes the pressure between the second member and a driving target member on the basis of a driving state of the driving target member.

12 Claims, 10 Drawing Sheets

FIG. 5

| | | FREEWHEELING IN STOP | | | | FRICTIONAL LOCKING IN STOP | | | | | | |
|---|---|---|---|---|---|---|---|---|---|---|---|---|
| | | (A) NO APPLICATION OF DC IN STOP | | (B) APPLICATION OF DC IN STOP | | (C) NO APPLICATION OF DC IN STOP | | (D) NO APPLICATION OF DC IN STOP | | (E) EXAMPLE OF CONVENTIONAL | | |
| | STATE OF PIEZO-ELECTRIC ELEMENT | PRESSURIZATION OF SLIDING SURFACE | DC VOLTAGE | PRESSURIZATION OF SLIDING SURFACE | DC VOLTAGE | PRESSURIZATION OF SLIDING SURFACE | DC VOLTAGE | PRESSURIZATION OF SLIDING SURFACE | DC VOLTAGE | STATE OF PIEZO-ELECTRIC ELEMENT | PRESSURIZATION OF SLIDING SURFACE | DC VOLTAGE |
| IN STOP | NOT STRESSED | NOT PRESSURIZED | NONE | NOT PRESSURIZED (CANCELLED WITH PRESSURIZATION OF SPRING) | APPLIED | PRESSURIZED (DUE TO PRESSURIZATION OF SPRING) | NONE | PRESSURIZED (REGARDLESS OF PRESSURIZATION OF SPRING) | NONE | — | PRESSURIZED (DUE TO PRESSURIZATION OF SPRING) | — |
| IN DRIVE | STRESSED | PRESSURIZED | APPLIED | PRESSURIZED (DUE TO PRESSURIZATION OF SPRING) | NONE | PRESSURIZED (SPRING+PIEZO-ELECTRIC PRESSURIZATION) | APPLIED | PRESSURIZED (REGARDLESS OF PRESSURIZATION OF SPRING) | APPLIED | — | PRESSURIZED (DUE TO PRESSURIZATION OF SPRING) | — |

PIEZOELECTRIC ACTUATOR, LENS BARREL, AND IMAGING DEVICE

BACKGROUND

1. Field of the Invention

The present invention relates to a piezoelectric actuator, a lens barrel, and an imaging device.

Priority is claimed on Japanese Patent Application No. 2010-220426, filed Sep. 30, 2010, the content of which is incorporated herein by reference.

2. Description of Related Art

A piezoelectric actuator is known in which a driving target member is driven by driving plural piezoelectric elements to cause tip members coming in contact with the driving target member to move elliptically (for example, see JP-A-2007-236138). In the piezoelectric actuator described in JP-A-2007-236138, when an XYZ orthogonal coordinate system is set up, the driving target member is driven in the X axis direction by the elliptical movement of the tip members parallel to the XZ plane.

However, the traditional piezoelectric actuator has a problem in that the vibration in the lifting direction in which the distance between a tip member and a base member varies and the vibration in the feed direction in which the distance between the tip member and the base member does not vary cannot be independently controlled. There is also a problem in that it is difficult to cause the tip member to efficiently vibrate in the lifting direction and in the feed direction.

SUMMARY

An object of aspects of the present invention is to provide a piezoelectric actuator, a lens barrel and an imaging device which can independently control vibrations in two different directions of a member to be driven by piezoelectric elements and which can cause the member to efficiently vibrate in two different directions.

According to an aspect of the present invention, there is provided a piezoelectric actuator including: a first piezoelectric element that performs thickness-shear vibration in a first direction; a first member that is driven by the first piezoelectric element and that vibrates in the first direction; a second piezoelectric element that is supported by the first member and that performs thickness-shear vibration in a second direction; a second member that is driven by the second piezoelectric element and that vibrates in the second direction; and a pressurizing section that generates a pressure between the second member and a driving target member driven by the second member, wherein the pressurizing section changes the pressure via a third piezoelectric element that deforms corresponding to a driving state of the driving target member.

According to another aspect of the present invention, there is provided a lens barrel including the piezoelectric actuator.

According to still another aspect of the present invention, there is provided an imaging device including the piezoelectric actuator.

According to the aspects of the present invention, it is possible to independently control vibrations in two different directions of a member to be driven by piezoelectric elements. It is also possible to cause a member to be driven by piezoelectric elements to efficiently vibrate in two different directions.

BRIEF DESCRIPTION OF THE DRAWINGS

FIG. 5 is a table illustrating states of the piezoelectric actuator according to the first embodiment.

DESCRIPTION OF EMBODIMENTS

Hereinafter, a piezoelectric actuator, a lens barrel, and an imaging device according to exemplary embodiments of the present invention will be described with reference to the accompanying drawings.

First Embodiment

A piezoelectric actuator according to a first embodiment performs a relative driving operation of displacing a rotor relative to a base member and drives an optical instrument such as a lens barrel of a camera (imaging device) or an electronic device through the use of the rotor.

Figure 1:
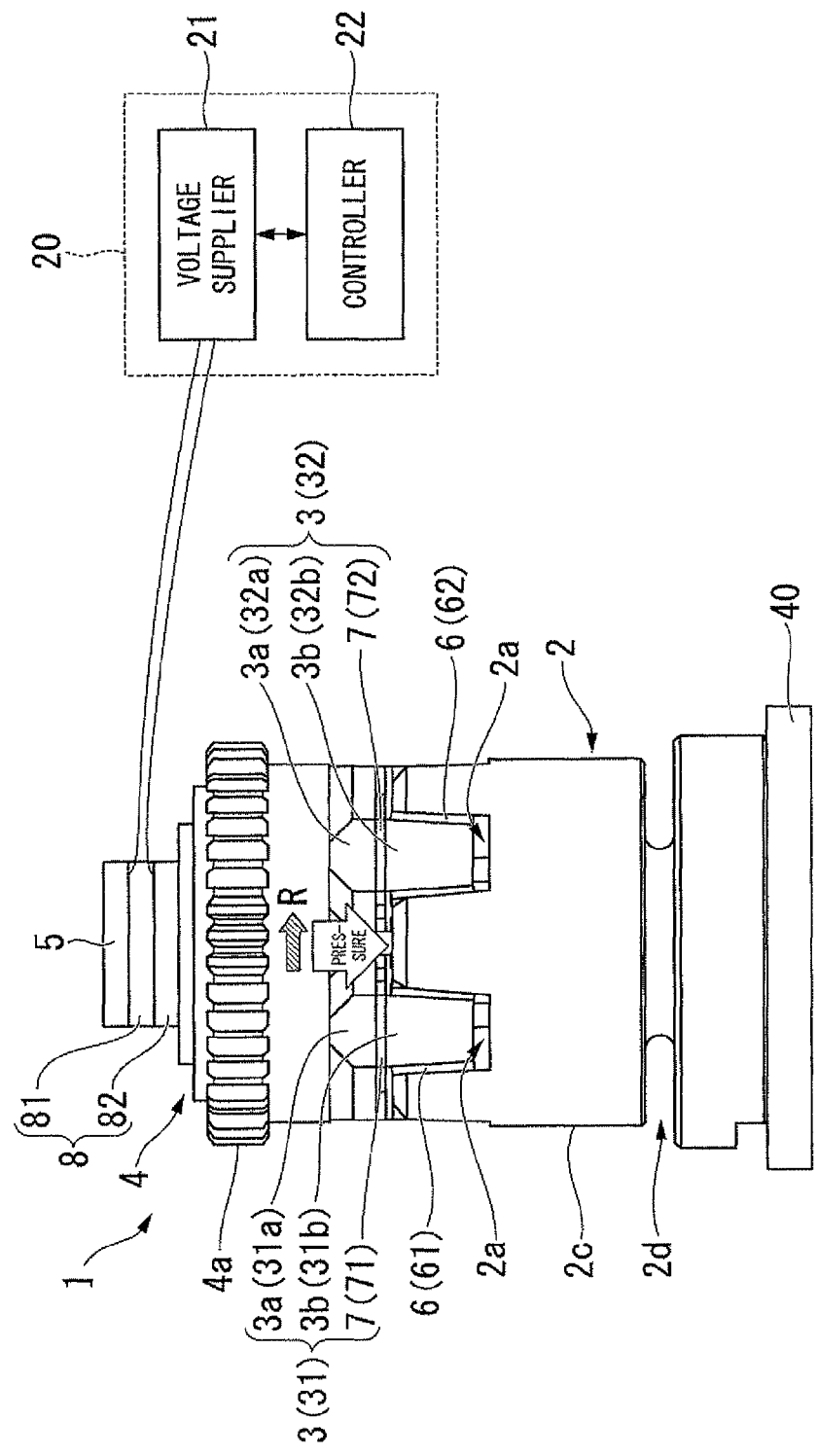
FIG. 1 is a diagram schematically illustrating the configuration of a piezoelectric actuator according to a first embodiment of the present invention.

FIG. 1 is a diagram schematically illustrating the configuration of the piezoelectric actuator 1 according to this embodiment. As shown in FIG. 1, the piezoelectric actuator 1 includes a base member 2, driving members 3, a rotor 4, a support shaft 5, first piezoelectric elements 6, second piezoelectric elements 7, a pressurizing section 8, and a pressurization controller 20.

The base member 2 is formed of a conductive member such as stainless steel which can be considered as an elastic material. The base member 2 has a hollow cylindrical shape having a through-hole in the axis direction formed at the center thereof. The surface of the base member 2 is subjected to an insulating process and, for example, an insulating film is formed thereon. The support shaft 5 is inserted into the through-hole of the base member 2.

At an end of the base member 2, plural holding portions 2a are arranged adjacent to each other in the circumferential direction of the base member 2. The holding portions 2a have a concave shape into which the driving members 3 are inserted and held from both sides in the circumferential direction of the base member 2. The other end of the base member 2 is fixed to a mounting section 40 by fastening members not shown such as bolts. A groove portion 2d continuous in the circumferential direction is formed in the part closer to the mounting section 40 than the central part of the base member 2.

The piezoelectric actuator 1 includes two sets of driving members 3 each having three driving members which are driven with a predetermined phase difference. In this embodiment, out of six driving members 3 arranged at a constant interval in the circumferential direction of the base member 2, three driving members 31 belong to a first set and three driving members 32 belong to a second set. The driving members 31 and the driving members 32 of the sets are alternately arranged in the circumferential direction of the base member 2, that is, in the rotation direction R of the rotor 4.

Each driving member 3 includes a base portion 3b (the first member) and a tip portion 3a (the second member).

The base portion 3b has an almost rectangular parallelepiped shape in which a pair of side faces intersecting the circumferential direction of the base member 2 is slightly inclined so that the distance therebetween is gradually reduced downward of the base member 2. The base portion 3b is formed of, for example, a light metal alloy and has conductivity. The base portion 3b is supported by the corresponding holding portion 2a so as to be driven in a direction (the first direction) parallel to the support shaft 5. The base portion 3b is driven by the first piezoelectric elements 6 and vibrates in the first direction.

The tip portion 3a has a hexagonal prism shape of which the section is mountain-like as viewed from the radial direction of the base member 2. The tip portion 3a is formed of, for example, stainless steel and has conductivity. The tip portion 3a is disposed between the base portion 3b and the rotor 4 and protrudes from the holding portion 2a to support the rotor 4. The tip portion 3a is driven by the second piezoelectric elements 7 and vibrates in a tangential direction (the second direction) of a central circle passing through the centers of the driving members 3.

The rotor 4 (the driving target member) is mounted on the support shaft 5 with bearings (not shown) interposed therebetween and is disposed to be rotatable forward and backward in the rotation direction R about the support shaft 5. A gear 4a used to drive a camera lens barrel or the like is formed on the outer circumferential surface of the rotor 4.

The surface of the rotor 4 opposed to the base member 2 is supported by plural driving members 3. The rotor 4 is driven by the tip portions 3a of the driving members 3.

The support shaft 5 is a circular rod-shaped (a cylindrical shape) member of which the center line is disposed to match with the rotation shaft of the rotor 4. The support shaft 5 is a member wherein one end thereof has a larger diameter in the circular rod shape which is, for example, a T-bone shape in the cross-sectional surface in the vertical direction and the larger diameter end presses down and fixes (pushes) the pressurizing section 8 from above. The other end of the support shaft 5 is fixed to the mounting section 40. The support shaft 5 penetrates the base member 2 and the rotor 4. The support shaft 5 is disposed at the center of the plural driving members 3 arranged in the rotation direction R of the rotor 4.

The first piezoelectric elements 6 are formed of, for example, a material containing piezoelectric zirconate titanate (PZT). The first piezoelectric elements 6 are deformed with an application of a voltage thereto. The first piezoelectric elements 6 are disposed between the inner surface in the holding portions 2a of the base member 2 and the side surfaces of the base portions 3b of the driving members 3. The first piezoelectric elements 6 are disposed to interpose the base portions 3b of the driving members 3 from the front and rear sides in the rotation direction R of the rotor 4. Two first piezoelectric elements 6 are disposed on each of the front side surface and the rear side surface of the base portion 3b of each driving member 3 in the rotation direction R of the rotor 4. The two first piezoelectric elements 6 on each side surface are arranged adjacent to each other in the diameter direction of the base member 2, that is, in the diameter direction of the rotor 4.

The first piezoelectric elements 6 have a rectangular shape long in the axis direction of the support shaft 5. The first piezoelectric elements 6 are deformed with an application of a voltage thereto. For example, the first piezoelectric elements 6 are deformed in a thickness-shear mode with the application of a voltage. That is, the first piezoelectric elements 6 are disposed to perform thickness-shear vibration in the longitudinal direction parallel to the axis direction (the first direction) of the support shaft 5.

Each first piezoelectric element 6 is bonded to both the inner surface of the corresponding holding portion 2a of the base member 2 and the side surface of the base portion 3b of the corresponding driving member 3 with a conductive adhesive.

Here, the thickness direction of each first piezoelectric element 6 is defined as a tangential direction of a rotating circle of the rotor 4 at the centers of the driving members 3, that is, a tangential direction of a central circle passing through the centers of the driving members 3.

The first piezoelectric elements 6 are supplied with a voltage from a power supply 10 (FIGS. 3A and 3B) to be described later.

The second piezoelectric elements 7 are formed of, for example, a material containing piezoelectric zirconate titanate. The second piezoelectric elements 7 are disposed between the tip portion 3a and the base portion 3b of each driving member 3. That is, the second piezoelectric elements 7 are supported by the base portion 3b of each driving member 3 and support the tip portion 3a on the base portion 3b. Two second piezoelectric elements 7 are arranged adjacent to each other in the diameter direction of the base member 2.

Each second piezoelectric element 7 has a rectangular shape long in the tangential direction of the central circle passing through the centers of the driving members 3, that is, the tangential direction of the rotating circle of the rotor 4 at the centers of the driving members 3. Each second piezoelectric element 7 is deformed with an application of a voltage thereto. For example, the second piezoelectric element 7 is deformed in the thickness-shear made with the application of a voltage. That is, the second piezoelectric element 7 are disposed to perform the thickness-shear vibration in the tangential direction of the central circle passing through the centers of the driving members 3, that is, the tangential direction (the second direction) of the rotating circle of the rotor 4 at the centers of the driving members 3. Each second piezoelectric element 7 is bonded to both the tip portion 3a and the base portion 3b of each driving member 3 with a conductive adhesive.

Here, the thickness direction of the second piezoelectric element 7 is defined to be parallel to the axis direction of the support shaft 5.

The second piezoelectric elements 7 are supplied from voltages from the power supply 10 (FIGS. 3A and 3B) to be described later.

The pressurizing section 8 is disposed between the end of the support shaft 5 having the larger diameter and the rotor 4. The pressurizing section 8 generates a pressure between the rotor 4 driven by the tip portions 3a of the driving members 3 and the tip portions 3a. The pressurizing section 8 includes a third piezoelectric element 81 and a rubber member 82.

The third piezoelectric element 81 is formed of, for example, a material containing piezoelectric zirconate titanate.

The third piezoelectric element 81 is disposed opposite to the rotor 4 with the rubber member 82. The third piezoelectric element 81 is disposed to change its thickness in the direction parallel to the support shaft 5 with an application of a voltage. The third piezoelectric element 81 changes the pressure between the rotor 4 and the tip portions 3a depending on the driving state of the rotor 4, by changing its thickness in the direction parallel to the support shaft 5 (the first direction). The third piezoelectric element 81 is supplied with a voltage from the pressurization controller 20.

The rubber member 82 is disposed between the third piezoelectric element 81 and the rotor 4. The rubber member 82 serves as a damping rubber damping the vibration of the rotor 4 in the direction parallel to the support shaft 5.

The pressurization controller 20 changes the voltage to be applied to the third piezoelectric element 81 and supplies (applies) the voltage to the third piezoelectric element 81. The pressurization controller 20 includes a voltage supplier 21 and a controller 22.

The voltage supplier 21 changes a voltage to be applied to the third piezoelectric element 81 on the basis of a control signal supplied from the controller 22 and supplies (applies) the changed voltage to the third piezoelectric element 81.

The controller 22 supplies the control signal to the voltage supplier 21 and controls the voltage to be applied to the third piezoelectric element 81.

The configuration of the pressurization controller 20 will be described below in details with reference to FIG. 2.

Figure 2:
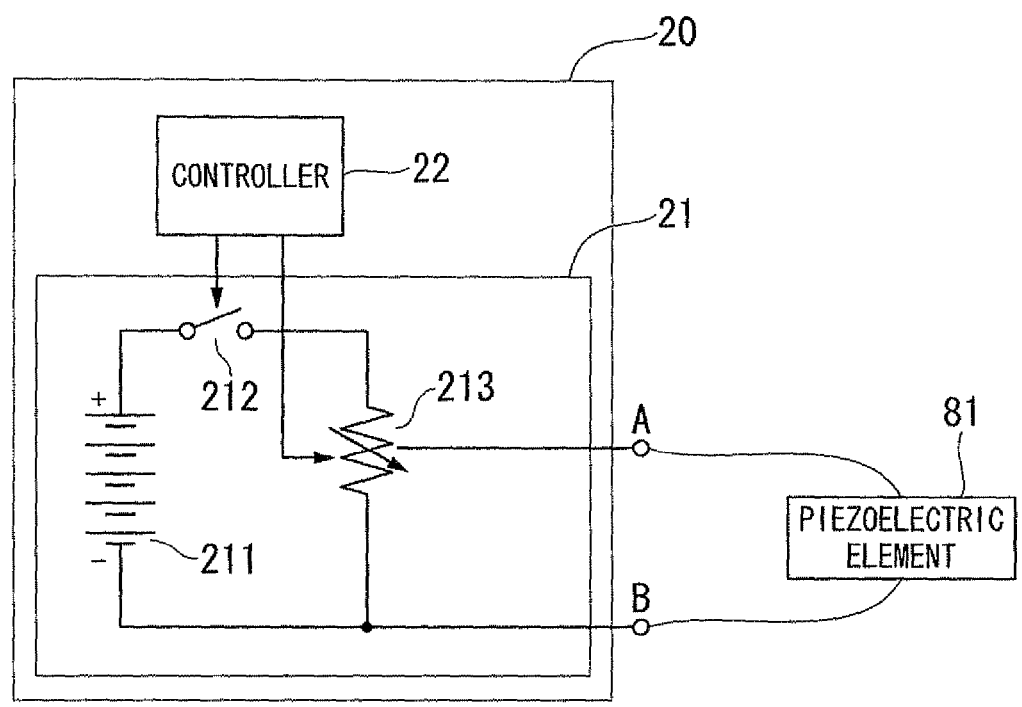
FIG. 2 is a block diagram schematically illustrating the configuration of a pressurization controller of the piezoelectric actuator according to the first embodiment.

FIG. 2 is a block diagram schematically illustrating the pressurization controller 20 of the piezoelectric actuator 1 according to this embodiment.

In FIG. 2, the pressurization controller 20 outputs the voltage generated by the voltage supplier 21 as a potential difference between output terminals A and B and supplies the voltage to the third piezoelectric element 81 via a signal line.

The voltage supplier 21 includes a DC power source 211, a switch 212, and a voltage changer 213.

The anode terminal of the DC power source 211 is connected to an end of the switch 212 and the cathode terminal thereof is connected to the output terminal B of the voltage supplier 21 and one end of the voltage changer 213. The DC power source 211 generates a DC voltage.

The end of the switch 212 is connected to the anode terminal of the DC power source 211 and the other end thereof is connected to the other end of the voltage changer 213. The switch 212 switches its state between an electrically-connected state and a non-electrically-connected state between the anode terminal of the DC power source 211 and the voltage changer 213 on the basis of the control signal supplied from the controller 22. That is, the switch 212 switches its state between a state where a voltage is supplied (applied) to the third piezoelectric element 81 and a state where a voltage is not supplied (applied) thereto on the basis of the control signal supplied from the controller 22.

The voltage changer 213 includes, for example, a variable resistor and outputs the voltage, which is obtained by changing the DC voltage generated by the DC power source 211 by resistance voltage-division, to the output terminal A of the voltage supplier 21. The switch 212 switches whether or not to output the voltage to the output terminal A on the basis of the control signal supplied from the controller 22.

The controller 22 supplies the control signal to the voltage supplier 21 to change the voltage to be applied to the third piezoelectric element 81. That is, the controller 22 supplies the control signal to the voltage supplier 21 to control the pressure between the rotor 4 and the tip portions 3a of the driving members 3. The controller 22 controls the third piezoelectric element 81 to change the pressure between the rotor 4 and the tip portions 3a of the driving members 3 depending on the driving state of the rotor 4.

The configuration of a driving circuit of the piezoelectric actuator 1 will be described below in detail with reference to FIGS. 3A and 313.

Figure 3A:
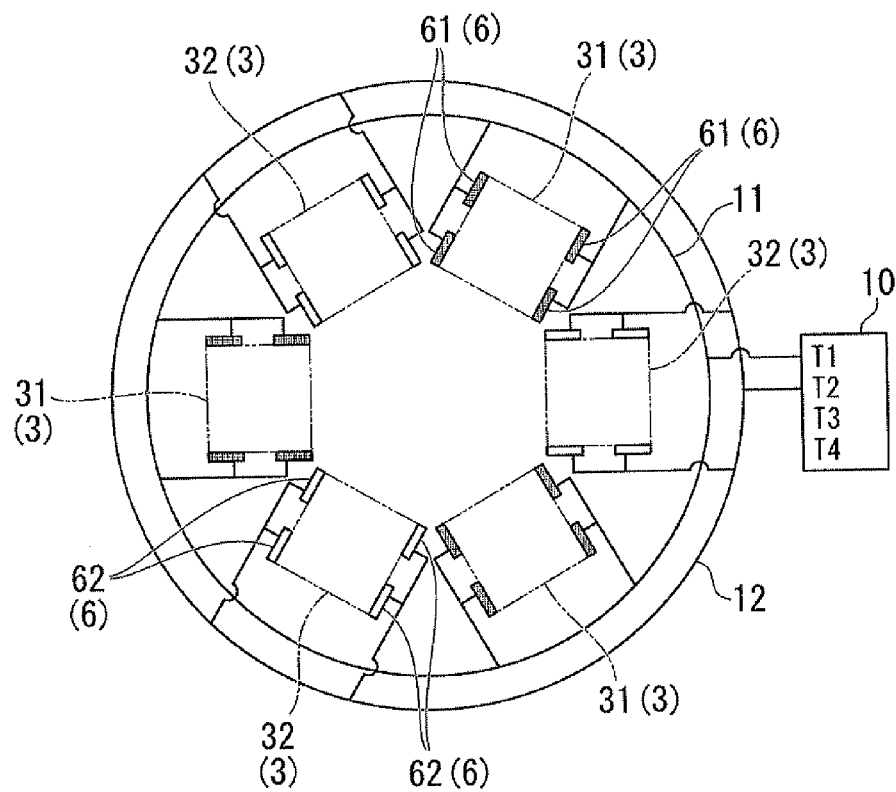
FIG. 3A is a circuit diagram illustrating a driving circuit of the piezoelectric actuator according to the first embodiment.
Figure 3B:
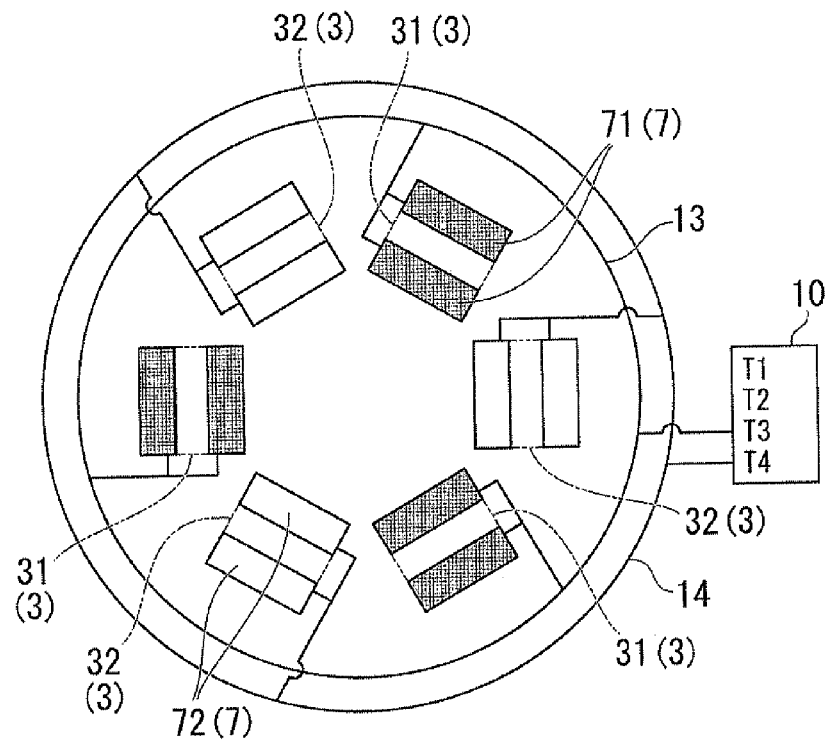
FIG. 3B is a circuit diagram illustrating the driving circuit of the piezoelectric actuator according to the first embodiment.

FIGS. 3A and 3B are circuit diagrams illustrating the driving circuit of the piezoelectric actuator 1 according to this embodiment.

As shown in FIGS. 3A and 3B, the piezoelectric actuator 1 includes a power supply 10 supplying voltages to the first piezoelectric elements 6 and the second piezoelectric elements 7.

The power supply 10 includes a first terminal T1 to a fourth terminal T4. The first to fourth terminals T1 to T4 supply sinusoidal voltages of a predetermined frequency. The power supply 10 supplies sinusoidal voltages of the same waveform having a predetermined phase difference across the first terminal T1 and the second terminal T2 and across the third terminal T3 and the fourth terminal T4.

As shown in FIG. 3A, among the first piezoelectric elements 6, the twelve first piezoelectric elements 61 disposed between the three driving members 31 belonging to the first set and the base member 2 are electrically connected to the first terminal T1 via a wiring 11. Among the first piezoelectric elements 6, the twelve first piezoelectric elements 62 disposed between the three driving members 32 belonging to the second set and the base member 2 are electrically connected to the second terminal T2 via a wiring 12.

As shown in FIG. 3B, among the second piezoelectric elements 7, the six second piezoelectric elements 71 disposed between the tip portion 31a and the base portion 31b of the three driving members 31 belonging to the first set are electrically connected to the third terminal T3 via a wiring 13. Among the second piezoelectric elements 7, the six second piezoelectric elements 72 disposed between the tip portion 32a and the base portion 32b of the three driving members 32 belonging to the second set are electrically connected to the fourth terminal T4 via a wiring 14.

The operation of the piezoelectric actuator 1 according to this embodiment will be described below.

The operation of causing the rotor 4 to rotate by the use of the driving members 3 in the piezoelectric actuator 1 will be first described.

At the time of causing the rotor 4 to rotate by the use of the driving members 3 in the piezoelectric actuator 1, the three driving members 31 of the first set are synchronously driven. The three driving members 32 of the second set are synchronously driven, similarly to the first set, with a predetermined phase difference from the three driving members 31 of the first set. Accordingly, the three driving members 31 of the first set and the three driving members 32 of the second set alternately support the rotor 4 to rotate.

Specifically, the first terminal T1 of the power supply 10 supplies a voltage of a sinusoidal waveform to the first piezoelectric elements 61. Then, the first piezoelectric elements 61 start the thickness-shear vibration in the first direction parallel to the support shaft 5. The driving members 31 are driven by the forward deformations (the deformations to the upper direction of the first direction in FIG. 1) of the first piezoelectric elements 61 and thus move in the direction in which they get away from the base member 2 (the direction in which they project outward from the holding portions 2a).

At this time, the third terminal T3 of the power supply 10 supplies a voltage of a sinusoidal waveform to the second piezoelectric elements 71. Then, the second piezoelectric elements 71 start the thickness-shear vibration to the tangential direction of the central circle passing through the centers of the driving members 3 (the second direction, the rotation direction R of the rotor 4, the tangential direction of the rotating circle of the rotor 4 at the centers of the driving members 3, the direction perpendicular to the axis direction of the support shaft 5. The tip portions 31a of the driving members 31 are driven by the forward deformations (the deformations to the front side direction of the rotation direction R) of the second piezoelectric elements 71 and thus move in that direction. At this time, the tip portions 31a of the driving members 31 cause the rotor 4 to rotate to the front side in the rotation direction R thereof by the use of a frictional force acting between the rotor 4 and the tip portions.

Thereafter, the first piezoelectric elements 61 start the deformation to the direction in which they get away from the rotor 4 (the lower direction of the first direction in FIG. 1 (the reverse direction)) in response to the voltage of a sinusoidal waveform supplied from the first terminal T1 of the power supply 10. The driving members 31 of the first set move in the direction in which they get away from the rotor 4 (the direction in which they irrupt into the holding portions 2a) by the deformation of the first piezoelectric elements 61 in the reverse direction.

At this time, the second piezoelectric elements 71 start the deformation to the rear side in the rotation direction R of the rotor 4 (the reverse direction) in response to the voltage of a sinusoidal waveform supplied from the third terminal T3 of the power supply 10. The tip portions 31a of the driving members 31 of the first set move to the rear side in the rotation direction R of the rotor 4 by the deformation of the second piezoelectric elements 71 in the reverse direction in the state where they are away from the rotor 4.

Thereafter, the driving members 31 of the first set repeat the contact of the tip portion 31a with the rotor 4, the driving of the tip portions 31a to the front side in the rotation direction R of the rotor 4, the separation of the tip portions 31a from the rotor 4, and the driving of the tip portions 31a to the rear side in the rotation direction R of the rotor 4. That is, the base portions 31b and the tip portions 31a of the driving members 31 are driven by the first piezoelectric elements 61 and vibrate in the first direction which is the axis direction of the support shaft 5. The tip portions 31a of the driving members 31 are driven by the second piezoelectric elements 71 and vibrate in a tangential direction of the central circle passing through the centers of the driving members 3, that is, the tangential direction of the rotating circle of the rotor 4 at the centers of the driving members 3 relative to the base portions 31b and the base member 2. Accordingly, the driving members 31 of the first set are driven so that the tip portions 31a thereof draw a circular locus or an elliptical locus as viewed from the radial direction of the rotor 4.

The driving members 32 of the second set are driven similarly to the driving members 31 of the first set with a predetermined phase difference from the driving members 31 of the first set. That is, the second terminal T2 of the power supply 10 supplies the first piezoelectric elements 62 with a voltage having the same sinusoidal waveform as the voltage supplied from the first terminal T1 but a predetermined phase difference from the voltage supplied from the first terminal T1. The fourth terminal T4 of the power supply 10 supplies the second piezoelectric elements 72 with a voltage having the same sinusoidal waveform as the voltage supplied from the third terminal T3 but having a predetermined phase difference from the voltage supplied from the third terminal T3.

The tip portions 32a of the three driving members 32 of the second set come in contact with the rotor 4 before the tip portions 31a of the three driving members 31 of the first set are separated from the rotor 4, and are separated from the rotor 4 after the tip portions 31a of the three driving members 31 of the first set come in contact with the rotor 4. Accordingly, the rotor 4 is alternately supported and driven by the three driving members 31 of the first set and the three driving members 32 of the second set, and rotates to the front side or the rear side in the rotation direction R at a predetermined rotation speed in the state where the position in the axis direction of the support shaft 5 is kept almost constant.

An example of the operation of the pressurizing section 8 in the piezoelectric actuator 1 will be described below.

Figure 4:
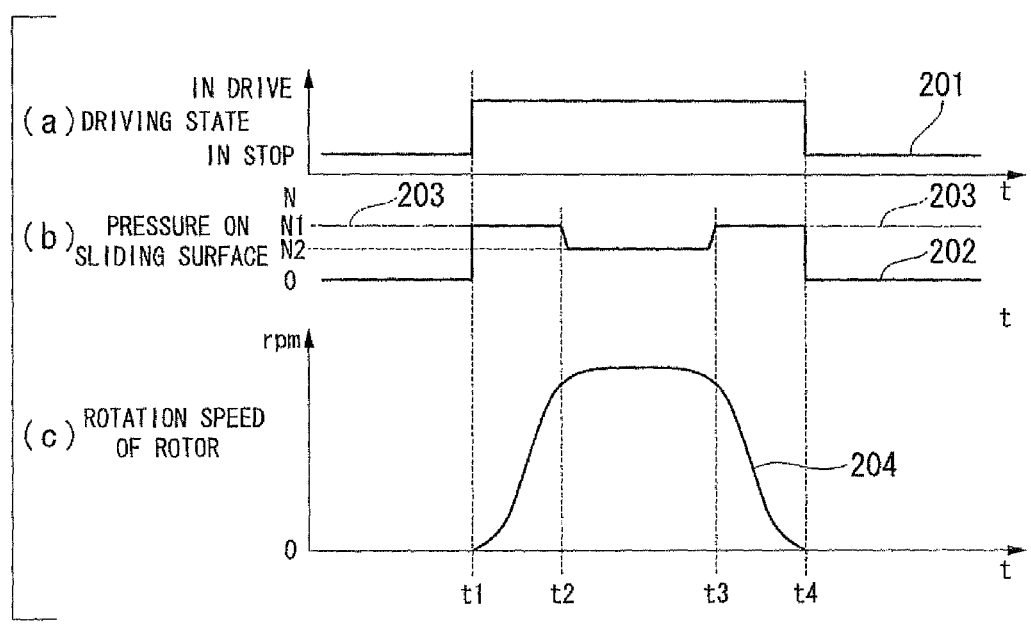
FIG. 4 is a diagram illustrating an example of the operation of a pressurizing section according to the first embodiment.

FIG. 4 is diagram illustrating an example of the operation of the pressurizing section 8 according to this embodiment.

An example where the driving of the rotor 4 is started at time t1 and the driving of the rotor 4 is stopped at time t4 is shown in FIG. 4.

A part (a) of FIG. 4 shows the driving state (in stop or in drive) of the rotor 4 (waveform 201).

A part (b) of FIG. 4 shows the pressure (the pressure between the rotor 4 and the tip portions 3a, hereinafter, the pressure N) on the sliding surface of the rotor 4. The waveform 202 is a waveform indicating the pressure N to be changed by the third piezoelectric element 81 in a case where the rotor 4 is changed to a freewheeling state when the rotor 4 is in the in-stop state of. The waveform 203 is a waveform indicating the pressure N in a case where the rotor 4 is changed to a locked state when the rotor 4 is in the in-stop state of.

Here, the freewheeling state means a state where the rotor 4 can freely move in the second direction. That is, the freewheeling state is a state where the frictional force between the rotor 4 and the tip portions 3a is substantially 0. The locked state means a state where the rotor 4 is locked by the frictional force between the rotor 4 and the tip portions 3a.

A part (c) of FIG. 4 shows the rotation speed rpm (rotations per minute) of the rotor 4 (waveform 204).

In the period up to time t1, the piezoelectric actuator 1 is in a state (in stop) where the rotor 4 is stopped as indicated by the waveform 201. Accordingly, the waveform 204 indicates a rotation speed of 0 rpm. In this period, in the case where the rotor 4 is changed to the freewheeling state when the rotor 4 is in the in-stop state, the pressurizing section 8 sets the value of the pressure N on the sliding surface of the rotor 4 to substantially 0 as indicated by the waveform 202. In this case, the controller 22 changes the switch 212 to the non-electrically-connected state through the use of the control signal. Accordingly, the voltage supplier 21 stops the application of a voltage to the third piezoelectric element 81. Therefore, the third piezoelectric element 81 sets the value of the pressure N on the sliding surface of the rotor 4 to substantially 0. As a result, the frictional force between the rotor 4 and the tip portions 3a becomes substantially 0 and the rotor 4 is in the freewheeling state. That is, the third piezoelectric element 81 changes the pressure between the rotor 4 and the tip portions 3a so that the frictional force between the rotor 4 and the tip portions 3a is substantially 0 when the rotor 4 enters the state where it can freely move in the second direction.

In the period up to time t1, in the case where the rotor 4 is changed to the locked state when the rotor 4 is in the in-stop state, the pressurizing section 8 sets the pressure N to a predetermined pressure (for example, N1) as indicated by the waveform 203. The controller 22 changes the switch 212 to the electrically-connected state through the use of the control signal. Accordingly, the voltage supplier 21 applies a voltage to the third piezoelectric element 81. The third piezoelectric element 81 increases its thickness in the direction parallel to the support shaft 5 in response to the voltage applied from the voltage supplier 21, and sets the value of the pressure N on the sliding surface of the rotor 4 to N1. Accordingly, the pressurizing section 8 generates the pressure N1 between the rotor 4 and the tip portions 3a. As a result, the frictional force is generated between the rotor 4 and the tip portions 3a, and the rotor 4 enters the locked state.

At time t1, the piezoelectric actuator 1 starts driving the rotor 4. Accordingly, the waveform 201 is changed from the in-stop state to the in-drive state. At the time of starting the driving of the rotor 4, the pressurizing section 8 sets the value of the pressure N on the sliding surface of the rotor 4 to N1 as indicated by the waveform 202. In this case, the controller 22 changes the switch 212 to the electrically-connected state through the use of the control signal. Accordingly, the voltage generated by the DC power source 211 is supplied to the third piezoelectric element 81 via the switch 212 and the voltage changer 213. That is, the voltage supplier 21 of the pressurization controller 20 supplies the voltage to the third piezoelectric element 81. The third piezoelectric element 81 increases its thickness in the direction parallel to the support shaft 5 (the first direction) in response to the voltage applied from the voltage supplier 21, and sets the value of the pressure N on the sliding surface of the rotor 4 to N1. Accordingly, the pressurizing section 8 generates the pressure N1 between the rotor 4 and the tip portions 3a. The power supply 10 supplies the voltages to the first piezoelectric elements 6 and the second piezoelectric elements 7 to cause the rotor 4 to rotate, as shown in FIGS. 3A and 3B.

In the period from time t1 to time t2, as indicated by the waveform 204, the piezoelectric actuator 1 accelerates the rotation of the rotor 4. In this period, in order to accelerate the rotor 4, it is necessary to raise the torque. Accordingly, the pressurizing section 8 maintains the pressure N1 between the rotor 4 and the tip portions 3a as indicated by the waveform 202.

In the period from time t2 to time t3, as indicated by the waveform 204, the piezoelectric actuator 1 causes the rotor 4 to rotate at a constant speed when the rotation speed of the rotor 4 reaches a predetermined speed. Here, the predetermined speed is, for example, the highest speed in the rotation of the rotor 4. When the rotor 4 is made to rotate at a constant speed, the pressurizing section 8 lowers the value of the pressure N on the sliding surface of the rotor 4 to N2 as indicated by the waveform 202.

In this case, the controller 22 controls the voltage changer 213 to change (lower) the voltage to a predetermined voltage through the use of the control signal. Accordingly, the voltage generated by the DC power source 211 is changed (lowered) to a predetermined voltage by the voltage changer 213 and the resultant voltage is then supplied to the third piezoelectric element 81. That is, the voltage supplier 21 of the pressurization controller 20 changes (lowers) the voltage to be applied to the third piezoelectric element 81. The third piezoelectric element 81 decreases its thickness in the direction parallel to the support shaft 5 and changes the value of the pressure N on the sliding surface of the rotor 4 to N2, in response to the changed voltage from the voltage supplier 21. That is, when the rotation speed of the rotor 4 is high, the third piezoelectric element 81 sets the pressure N on the sliding surface of the rotor 4 to be lower than that when the rotation speed is low. When the rotation speed of the rotor 4 is the highest, the third piezoelectric element 81 sets the pressure N on the sliding surface of the rotor 4 to be lower than that when the driving of the rotor 4 is started. Therefore, the pressurizing section 8 lowers the value of the pressure N between the rotor 4 and the tip portions 3a from N1 to N2.

When the rotor 4 is made to rotate at a constant speed, the torque does not have to be so high as accelerating the rotor 4. In this case, when the pressure N on the sliding surface of the rotor 4 is higher, the rotation speed may be suppressed by the frictional force generated between the rotor 4 and the tip portions 3a. Accordingly, when the rotor 4 is made to rotate at a constant speed, the pressurizing section 8 sets the pressure N on the sliding surface of the rotor 4 to be lower than that when the driving of the rotor 4 is started. As a result, the piezoelectric actuator 1 can efficiently drive the rotor 4 and can raise the highest speed.

In the period from time t3 to time t4, as indicated by the waveform 204, the piezoelectric actuator 1 decelerates the rotation of the rotor 4 and stops the rotation of the rotor 4 at time t4. In this period, in order to decorate the rotor 4, it is necessary to raise the torque. Accordingly, the pressurizing section 8 changes the value of the pressure N between the rotor 4 and the tip portions 3a to N1 again. In this case, the controller 22 controls the voltage changer 213 to raise the voltage to a predetermined voltage through the use of the control signal.

Accordingly, the voltage generated by the DC power source 211 is changed to a predetermined voltage by the voltage changer 213 and the resultant voltage is then supplied to the third piezoelectric element 81. That is, the voltage supplier 21 of the pressurization controller 20 changes (raises) the voltage to be applied to the third piezoelectric element 81. The third piezoelectric element 81 increases its thickness in the direction parallel to the support shaft 5 and changes the value of the pressure N on the sliding surface of the rotor 4 to N1, in response to the changed voltage from the voltage supplier 21. That is, when the driving of the rotor 4 is stopped, the third piezoelectric element 81 sets the pressure N on the sliding surface of the rotor 4 to be higher than that when the rotation speed of the rotor 4 is the highest. Therefore, the pressurizing section 8 raises the value of the pressure N between the rotor 4 and the tip portions 3a from N2 to N1.

After time t4, the piezoelectric actuator 1 is in the state where the rotor 4 is stopped (in stop) as indicated by the waveform 201. In this period, the pressurizing section 8 performs the same operation as in the period up to time t1.

As described above, the piezoelectric actuator 1 includes the first piezoelectric element 6 performing the thickness-shear vibration in the first direction parallel to the support shaft 5 and the second piezoelectric elements 7 performing the thickness-shear vibration in the tangential direction of the central circle passing through the centers of the driving members 3, that is, the tangential direction (second direction) of the rotating circle of the rotor 4 at the centers of the driving members 3.

Accordingly, the piezoelectric actuator 1 can make the base portions 3b and the tip portions 3a of the driving members 3 vibrate in the direction parallel to the support shaft 5, relative to the base member 2 by the use of the first piezoelectric elements 6. Furthermore, the piezoelectric actuator 1 can make the tip portions 3a of the driving members 3 vibrate in the tangential direction of the central circle passing through the centers of the driving members 3, that is, the tangential direction of the rotating circle of the rotor 4 at the centers of the driving members 3, relative to the base member 2 and the base portions 3b of the driving members 3 by the use of the second piezoelectric elements 7.

The piezoelectric actuator 1 includes the pressurizing section 8 that generates the pressure between the rotor 4 (the driving target member) to be driven by the tip portions 3a and the tip portions 3a. The pressurizing section 8 includes the third piezoelectric element 81 that changes the pressure between the rotor 4 and the tip portions 3a depending on the driving state of the rotor 4. Accordingly, the piezoelectric actuator 1 can optimally set the pressure between the rotor 4 and the tip portions 3a depending on the driving state of the rotor 4.

Therefore, in the piezoelectric actuator 1 according to this embodiment, it is possible to independently control the vibration of the tip portions 3a of the driving members 3 in the direction parallel to the support shaft 5 and the vibration of the tip portions 3a in the tangential direction of the rotating circle of the rotor 4 at the centers of the driving members 3 by independently driving the first piezoelectric elements 6 and the second piezoelectric elements 7. Accordingly, it is possible to allow the driving members 3 to more efficiently vibrate in the directions and thus to cause the rotor 4 to more efficiently rotate, than ever before.

When the rotation speed of the rotor 4 in drive is high, the third piezoelectric element 81 sets the pressure between the rotor 4 and the tip portions 3a to be lower than that when the rotation speed of the rotor 4 is low. Accordingly, at the time of driving the rotor 4, the piezoelectric actuator 1 raises the torque when the rotation speed of the rotor 4 is low, and lowers the torque when the rotation speed of the rotor 4 is high. As a result, the piezoelectric actuator 1 can cause the rotor 4 to more efficiently rotate, than ever before.

When the rotation speed of the rotor 4 is the highest, the third piezoelectric element 81 sets the pressure between the rotor 4 and the tip portions 3a to be lower than that when the driving of the rotor 4 is started or stopped. Accordingly, at the time of driving the rotor 4, the piezoelectric actuator 1 can raise the torque for driving the rotor 4 in the acceleration state (when the driving of the rotor 4 is started) or in the deceleration state (when the driving of the rotor 4 is stopped) requiring a high torque. When the rotation speed of the rotor 4 is the highest (when a high torque is not necessary), the torque for driving the rotor 4 can be lowered. Accordingly, the piezoelectric actuator 1 can cause the rotor 4 to more efficiently rotate. Since the frictional force between the rotor 4 and the tip portions 3a can be reduced, the piezoelectric actuator 1 can raise the highest rotation speed of the rotor 4. Here, the highest speed may include a rotation speed close to the highest speed.

When the rotor 4 enters the state (the freewheeling state) where it can freely move in the second direction, the third piezoelectric element 81 changes the pressure between the rotor 4 and the tip portions 3a so that the frictional force between the rotor 4 and the tip portions 3a is substantially 0. Accordingly, the piezoelectric actuator 1 can set the rotor 4 to be in the freewheeling state.

The piezoelectric actuator 1 according to this embodiment can set the rotor 4 to various states (driving states), since it can change the pressure between the rotor 4 and the tip portions 3a by the use of the third piezoelectric element 81 of the pressurizing section 8.

FIG. 5 is a table illustrating the comparison in states of the piezoelectric actuator 1 according to this embodiment with the piezoelectric actuator according to the related art described in JP-A-2007-236138. The states in this table include the state (presence or absence of a stress) of the third piezoelectric element 81, the pressurization on the sliding surface of the rotor 4, and the application of a voltage to the third piezoelectric element 81. Each state includes two cases of the case where the rotor 4 is in the in-stop state and the case where the rotor 4 is in the in-drive state.

In this embodiment, the pressurizing section 8 may include a spring member (the elastic member) not shown that generates the pressure between the rotor 4 and the tip portions 3a in cooperation with the third piezoelectric element 81.

The state (a) indicates a state where the rotor 4 is in the freewheeling state when the rotor 4 is in the in-stop state and the third piezoelectric element 81 is not applied with a voltage when the rotor 4 is in the in-stop state. In this state, the third piezoelectric element 81 is not applied with a voltage from the voltage supplier 21 when the rotor 4 is in the in-stop state. Accordingly, the third piezoelectric element 81 is in the stress-free state and the sliding surface of the rotor 4 is in the non-pressurized state. Accordingly, the rotor 4 is in the freewheeling state. Here, the pressurizing section 8 does not include a spring member.

The state (b) indicates a state where the rotor 4 is in the freewheeling state when the rotor 4 is in the in-stop state and the third piezoelectric element 81 is applied with a voltage when the rotor 4 is in the in-stop state. Here, the pressurizing section 8 includes a spring member. In this state, the third piezoelectric element 81 is applied with a voltage (negative (−) voltage) from the voltage supplier 21 when the rotor 4 is in the in-stop state. Accordingly, the third piezoelectric element 81 decreases its thickness in the direction parallel to the support shaft 5 and cancels the pressure given from the spring member. Therefore, the rotor 4 is in the freewheeling state. That is, the piezoelectric actuator 1 can realize the freewheeling state when the pressurizing section 8 includes a spring member.

In the state (b), when the rotor 4 is driven, the voltage supplier 21 may not apply a voltage to the third piezoelectric element 81 or may apply a voltage (negative (−) voltage) thereto, due to the pressurization by the spring member. When the voltage supplier 21 applies a voltage (negative (−) voltage), the piezoelectric actuator 1 can lower the pressure between the rotor 4 and the tip portions 3a depending on the driving state of the rotor 4. Accordingly, the piezoelectric actuator 1 can cause the rotor 4 to more efficiently rotate than ever before.

The state (c) indicates a state where the rotor 4 is in the locked state when the rotor 4 is in the in-stop state and the third piezoelectric element 81 is not applied with a voltage when the rotor 4 is in the in-stop state. Here, the pressurizing section 8 includes a spring member. In this state, the third piezoelectric element 81 is not applied with a voltage from the voltage supplier 21 when the rotor 4 is in the in-stop state. That is, the sliding surface of the rotor 4 is pressurized by the spring member into the locked state. Accordingly, in the case where the rotor 4 is changed to be in the locked state when the rotor 4 is in the in-stop state, it is not necessary to apply a voltage to the third piezoelectric element 81 of the piezoelectric actuator 1. Accordingly, the piezoelectric actuator 1 can reduce the power consumption when the rotor 4 is in the locked state when the rotor 4 is in the in-stop state.

In the state (c), when the rotor 4 is driven, the voltage supplier 21 applies a voltage to the third piezoelectric element 81. Accordingly, the piezoelectric actuator 1 can change the pressure between the rotor 4 and the tip portions 3a depending on the driving state of the rotor 4. Accordingly, the piezoelectric actuator 1 can cause the rotor 4 to more efficiently rotate than ever before.

The state (d) indicates a state where the rotor 4 is changed to the locked state when the rotor 4 is in the in-stop state and the third piezoelectric element 81 is applied with a voltage when the rotor 4 is in the in-stop state. Here, the pressurizing section 8 may include a spring member or may not include a spring member. In this state, the third piezoelectric element 81 is supplied with a voltage from the voltage supplier 21 when the rotor 4 is in the in-stop state. That is, the sliding surface of the rotor 4 is pressurized by the third piezoelectric element 81 into the locked state.

In the state (d), when the rotor 4 is driven, the voltage supplier 21 applies a voltage to the third piezoelectric element 81. Accordingly, the piezoelectric actuator 1 can change the pressure between the rotor 4 and the tip portions 3a depending on the driving state of the rotor 4. Accordingly, the piezoelectric actuator 1 can cause the rotor 4 to more efficiently rotate than ever before.

Another example of the operation of the pressurizing section 8 in the piezoelectric actuator 1 will be described below.

Figure 6:
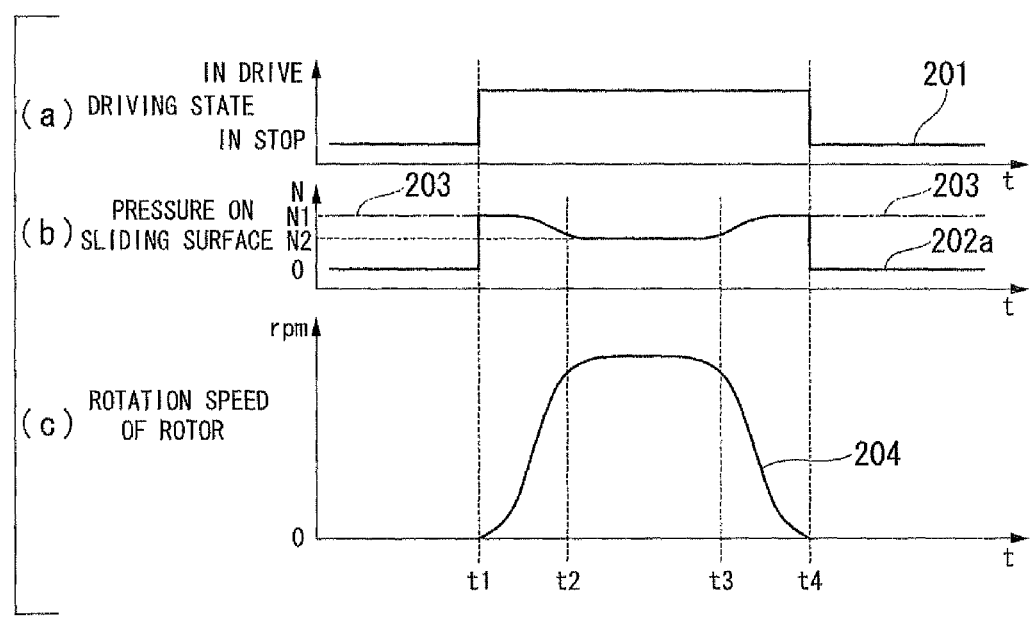
FIG. 6 is a diagram illustrating another example of the operation of a pressurizing section according to the first embodiment.

FIG. 6 is diagram illustrating another example of the operation of the pressurizing section according to this embodiment.

In FIG. 6, similarly to FIG. 4, an example where the driving of the rotor 4 is started at time t1 and the driving of the rotor 4 is stopped at time t4 is shown. FIG. 6 is the same as FIG. 4, except that a waveform 202a of a part (b) of FIG. 6 is different from the waveform of a part (b) of FIG. 4. Here, the waveform 202a of the part (b) of FIG. 6 will be described.

In the period from time t1 to time t4, the pressurizing section 8 changes the pressure N on the sliding surface of the rotor 4 on the basis of the rotation speed of the rotor 4, as indicated by the waveform 202a. Here, the operation of the pressurizing section 8 in the period from time t1 to time t4 will be described with reference to the waveform 202a.

First, in the period from time t1 to time t2, the pressurizing section 8 lowers the pressure N on the sliding surface of the rotor 4 on the basis of the rotation speed of the rotor 4, as indicated by the waveform 202a. In this case, the controller 22 controls the voltage changer 213 to change (lower) the voltage on the basis of the rotation speed of the rotor 4 through the use of the control signal. Accordingly, the voltage generated from the DC power source 211 is changed (lowered) to the voltage by the voltage changer 213 and the resultant voltage is supplied to the third piezoelectric element 81. That is, the voltage supplier 21 of the pressurization controller 20 changes the voltage to be applied to the third piezoelectric element 81 depending on the rotation speed of the rotor 4. The third piezoelectric element 81 decreases its thickness in the direction parallel to the support shaft 5 (the first direction) in response to the changed (lowered) voltage from the voltage supplier 21, and changes the value of the pressure N on the sliding surface of the rotor 4 from N1 to N2 on the basis of the rotation speed of the rotor 4.

In the period from time t2 to time t3, the rotor 4 maintains the rotation speed which is substantially the highest speed as indicated by the waveform 204. Accordingly, the pressurizing section 8 maintains the pressure N2 on the sliding surface of the rotor 4 as indicated by the waveform 202a.

In the period from time t3 to time t4, the pressurizing section 8 raises the pressure N on the sliding surface of the rotor 4 on the basis of the rotation speed of the rotor 4 as indicated by the waveform 202a. In this case, the controller 22 controls the voltage changer 213 to change (raise) the voltage on the basis of the rotation speed of the rotor 4 through the use of the control signal. Accordingly, the voltage generated from the DC power source 211 is changed to the voltage by the voltage changer 213 and the resultant voltage is supplied to the third piezoelectric element 81. That is, the voltage supplier 21 of the pressurization controller 20 changes the voltage to be applied to the third piezoelectric element 81 on the basis of the rotation speed of the rotor 4. The third piezoelectric element 81 increases its thickness in the direction parallel to the support shaft 5 in response to the changed voltage from the voltage supplier 21, and changes the value of the pressure N on the sliding surface of the rotor 4 from N2 to N1 on the basis of the rotation speed of the rotor 4.

In the period up to time t1 and the period from time 14, the operation of the pressurizing section 8 is the same as in FIG. 4.

As described above, the third piezoelectric element 81 changes the pressure between the rotor 4 and the tip portions 3a on the basis of the rotation speed of the rotor 4. That is, when the rotation speed of the rotor 4 in drive is higher as the driving state of the rotor 4, the third piezoelectric element 81 sets the pressure between the rotor 4 and the tip portions 3a to be lower than that when the rotation speed of the rotor 4 is low. Accordingly, at the time of driving the rotor 4, the piezoelectric actuator 1 raises the torque when the rotation speed of the rotor 4 is low, and lowers the torque when the rotation speed of the rotor 4 is high. As a result, the piezoelectric actuator 1 according to this embodiment can cause the rotor 4 to more efficiently rotate, similarly to the example shown in FIG. 4.

Second Embodiment

A piezoelectric actuator 1 according to a second embodiment of the present invention will be described below. The piezoelectric actuator 1 according to this embodiment applies an AC voltage to the third piezoelectric element 81 and detects a pressure between the rotor 4 and the tip portions 3a. The piezoelectric actuator 1 controls the pressure between the rotor 4 and the tip portions 3a in a feedback manner on the basis of the detected pressure. Accordingly, the pressurization controller of the piezoelectric actuator 1 according to this embodiment is different from the pressurization controller 20 shown in FIG. 2. The basic configuration of the piezoelectric actuator 1 is the same as the configuration shown in FIG. 1 and FIGS. 3A and 3B according to the first embodiment.

Figure 7:
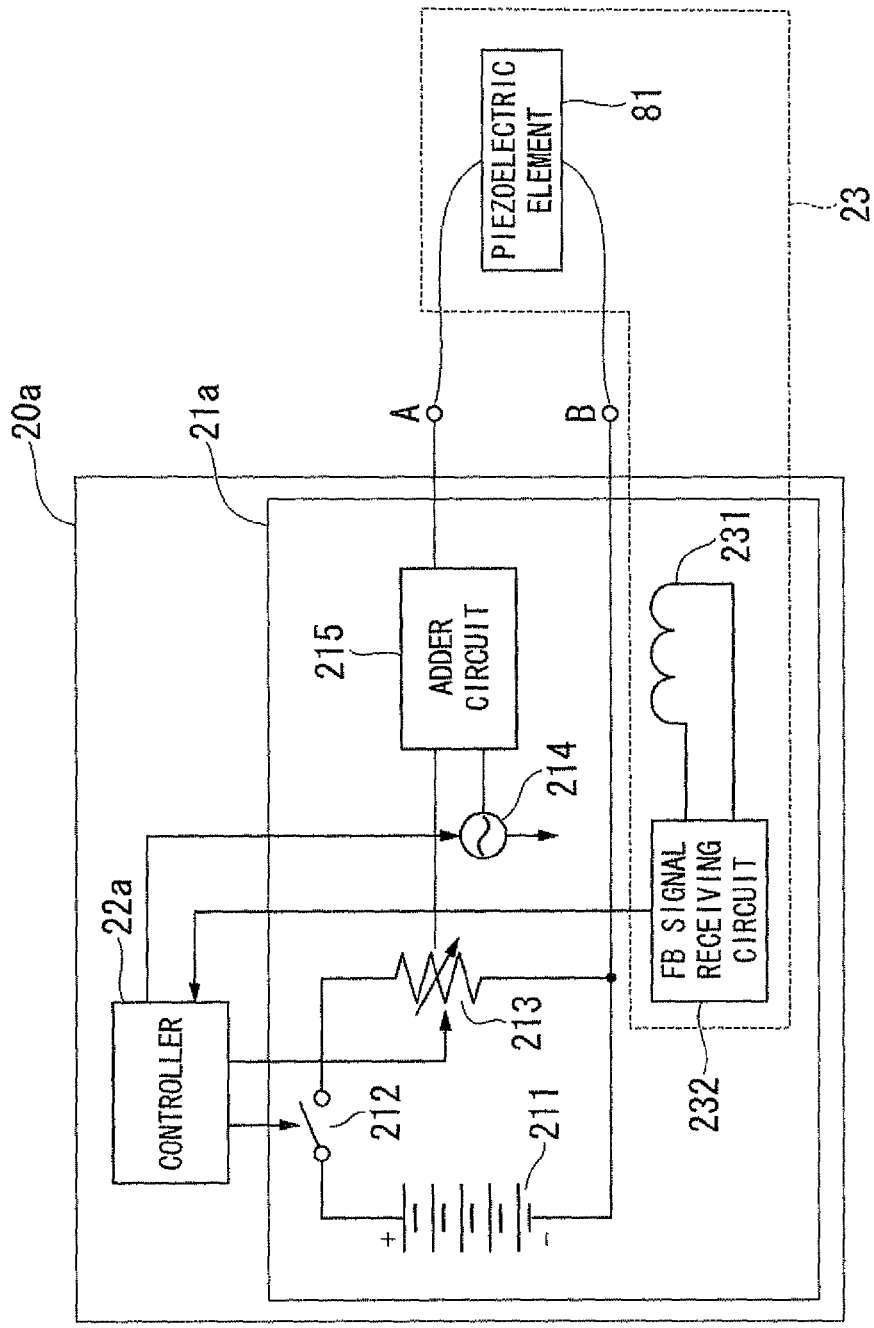
FIG. 7 is a first block diagram schematically illustrating an example of a pressurization controller of a piezoelectric actuator according to a second embodiment of the present invention.

FIG. 7 is a block diagram schematically illustrating the configuration of a pressurization controller 20a of an example of the piezoelectric actuator 1 according to this embodiment. In FIG. 7, the same elements as shown in FIG. 2 are referenced by the same reference signs.

In FIG. 7, the pressurization controller 20a includes a voltage supplier 21a and a controller 22a. The pressurization controller 20a outputs a driving signal with the generated voltage as the potential difference between output terminals A and B and supplies the driving signal to the third piezoelectric element 81 via a signal line. The voltage supplier 21a changes the voltage to be applied to the third piezoelectric element 81 on the basis of a control signal supplied from the controller 22a and supplies (applies) the changed voltage to the third piezoelectric element 81. The voltage supplier 21a supplies the third piezoelectric element 81 with a driving signal in which an AC signal is superimposed on a DC voltage. The voltage supplier 21a includes a DC power source 211, a switch 212, a voltage changer 213, an AC signal generator 214, a superimposing circuit 215 (adder circuit), a coil 231, and an FB (feedback) signal receiving circuit 232. The piezoelectric actuator 1 includes a detection unit 23. Here, the detection unit 23 includes the coil 231, the FB signal receiving circuit 232, and the third piezoelectric element 81. In this embodiment, the voltage changer 213 outputs a voltage, which is obtained by changing the DC voltage generated from the DC power source 211 by resistance voltage-division, to the superimposing circuit 215.

The AC signal generator 214 generates an AC signal on the basis of the control signal supplied from the controller 22a. The AC signal generator 214 supplies the generated AC signal to the superimposing circuit 215 (adder circuit).

The superimposing circuit 215 is an adder circuit constructed by an operational amplifier (an operational amplification circuit) or the like. The superimposing circuit 215 superimposes the AC signal generated from the AC signal generator 214 on the DC voltage supplied from the voltage changer 213 to generate a driving signal. The superimposing circuit 215 outputs the generated driving signal to the output terminal A of the voltage supplier 21a.

The coil 231 detects a current variation of the AC signal in a signal line connected to the output terminal B due to the electromotive force generated in the third piezoelectric element 81 on the basis of the pressure between the rotor 4 and the tip portions 3a and outputs the detected current variation as an AC signal to the FB signal receiving circuit 232.

The FB signal receiving circuit 232 detects a variation in the pressure between the rotor 4 and the tip portions 3a on the basis of the AC signal supplied from the coil 231 and supplies the detection result to the controller 22a. The third piezoelectric element 81 increases its thickness in the direction parallel to the support shaft 5 with the application of a voltage and generates an electromotive force based on the pressure between the rotor 4 and the tip portions 3a. The detection unit 23 detects the current variation due to the electromotive force generated in the third piezoelectric element 81 through the use of the coil 231 and the FB signal receiving circuit 232 and detects the pressure between the rotor 4 and the tip portions 3a on the basis of the detected current variation.

The controller 22a supplies the control signal to the voltage supplier 21a to change the voltage to be applied to the third piezoelectric element 81. That is, the controller 22a supplies the control signal to the voltage supplier 21a to control the pressure between the rotor 4 and the tip portions 3a of the driving members 3. The controller 22a controls the third piezoelectric element 81 to change the pressure between the rotor 4 and the tip portions 3a of the driving members 3 depending on the driving state of the rotor 4. The controller 22a supplies the control signal to the voltage supplier 21a, superimposes the AC signal generated from the AC signal generator 214 on the DC voltage supplied from the voltage changer 213, and supplies the driving signal to the third piezoelectric element 81. The controller 22a controls the voltage supplier 21a to change the driving signal on the basis of the pressure between the rotor 4 and the tip portions 3a detected by the detection unit 23. Specifically, the controller 22a supplies the control signal to the AC signal generator 214 to change the driving signal. Accordingly, the AC signal generator 214 changes the driving signal to be supplied to the third piezoelectric element 81.

The operation of the piezoelectric actuator 1 according to this embodiment will be described below.

The operation of causing the rotor 4 to rotate by the use of the driving members 3 in the piezoelectric actuator 1 according to this embodiment is the same as in the first embodiment. The operation of the pressurizing section 8 in the piezoelectric actuator 1 according to this embodiment is the same as in the first embodiment shown in FIG. 4 and FIG. 6. Here, the feedback control by the pressurization controller 20a according to the example of this embodiment will be described.

As shown in FIG. 7, in the pressurization controller 20a, the controller 22a controls the AC signal generator 214 to generate an AC signal. The superimposing circuit 215 superimposes the AC signal generated from the AC signal generator 214 on the DC voltage supplied from the voltage changer 213 to generate a driving signal. The superimposing circuit 215 supplies the generated driving signal to the third piezoelectric element 81. Accordingly, the controller 22a controls the pressure between the rotor 4 and the tip portions 3a of the driving members 3.

The controller 22a controls the AC signal generator 214 to change the AC signal on the basis of the pressure between the rotor 4 and the tip portions 3a detected through the use of the coil 231 and the FB signal receiving circuit 232 in the detection unit 23. Incidentally, a difference may be present between the pressure to be controlled by the controller 22a and the pressure actually generated between the rotor 4 and the tip portions 3a of the driving members 3 due to disturbance (external environment and conditions) or the like. In this case, the controller 22a controls the AC signal generator 214 to change the AC signal so as to remove the influence of the disturbance or the like. That is, the controller 22a performs the feedback control of changing the voltage which is to be subsequently supplied to the third piezoelectric element 81 on the basis of the pressure between the rotor 4 and the tip portions 3a detected by the detection unit 23.

As described above, the piezoelectric actuator 1 according to this embodiment includes the voltage supplier 21a supplying the driving signal, in which the AC signal is superimposed on the DC voltage, to the third piezoelectric element 81 and the detection unit 23 detecting the pressure between the rotor 4 and the tip portions 3a. The controller 22a controls the voltage supplier 21a to change the driving signal to be supplied to the third piezoelectric element 81 on the basis of the pressured detected by the detection unit 23. Accordingly, the controller 22a can reduce the influence of the disturbance or the like and can control the pressure between the rotor 4 and the tip portions 3a with high precision. Therefore, the piezoelectric actuator 1 according to this embodiment can cause the rotor 4 to more efficiently rotate than ever before.

The detection unit 23 detects the pressure generated between the rotor 4 and the tip portions 3a on the basis of the electromotive force generated in the third piezoelectric element 81 due to the pressure between the rotor 4 and the tip portions 3a. Accordingly, it is not necessary to provide a sensor detecting the pressure generated between the rotor 4 and the tip portions 3a. Therefore, the piezoelectric actuator 1 according to this embodiment can suppress the increase in the number of components and can control the pressure between the rotor 4 and the tip portions 3a with high precision. Another example where the pressure between the rotor 4 and the tip portions 3a is subjected to the feedback control based on the detected pressure in the piezoelectric actuator 1 according to another example of this embodiment will be described below.

Figure 8:
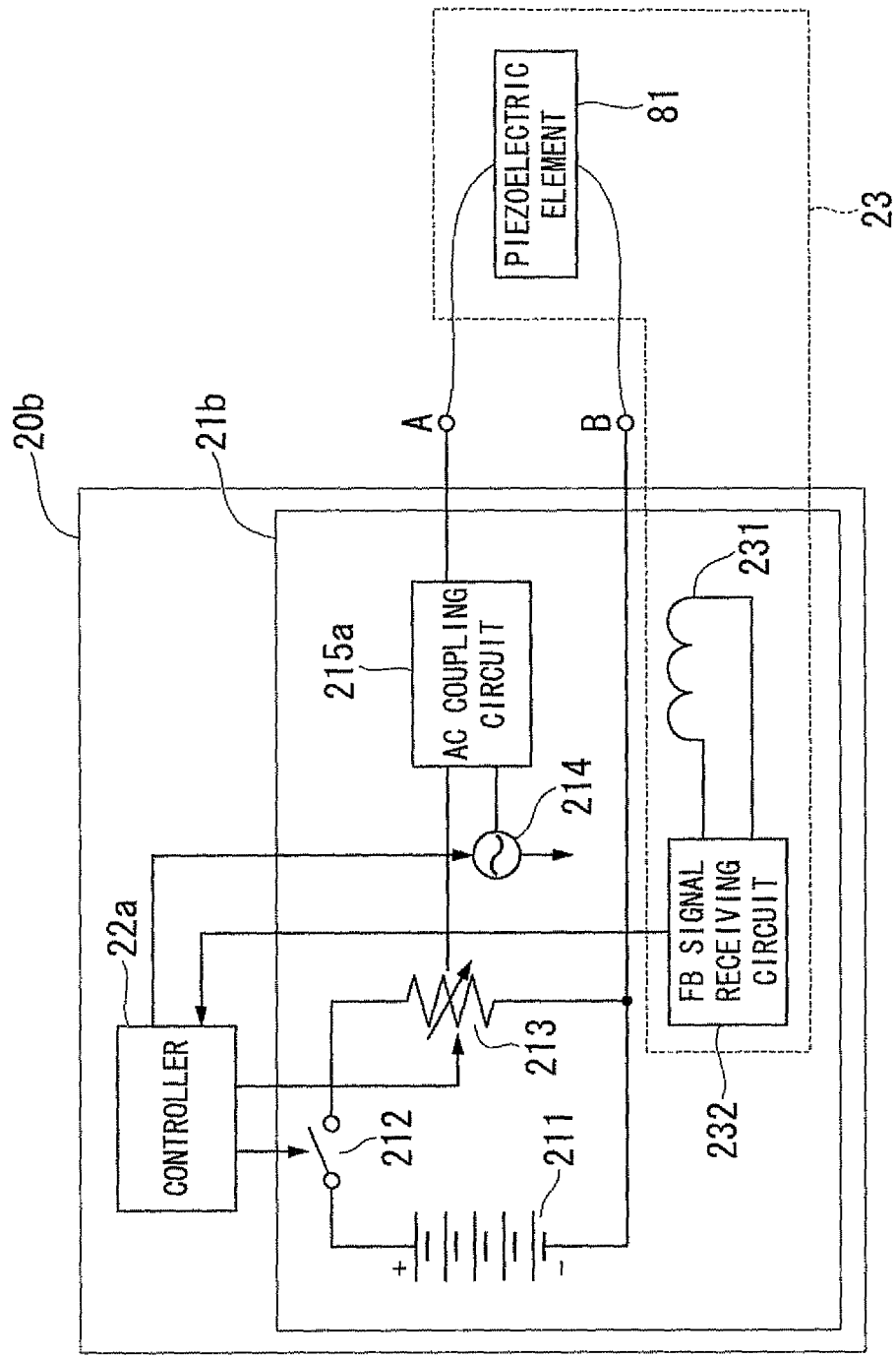
FIG. 8 is a second block diagram schematically illustrating another example of the pressurization controller of the piezoelectric actuator according to the second embodiment of the present invention.

FIG. 8 is a block diagram schematically illustrating a pressurization controller 20b of the piezoelectric actuator 1 according to this embodiment. In FIG. 8, the same elements as shown in FIG. 7 are referenced by the same reference signs.

In FIG. 8, the pressurization controller 20b includes a voltage supplier 21b and a controller 22a. The pressurization controller 20b outputs a driving signal with the generated voltage as a potential difference between the output terminals A and B and supplies the driving signal to the third piezoelectric element 81 through a signal line.

The voltage supplier 21b changes a voltage to be supplied to the third piezoelectric element 81 on the basis of the control signal supplied from the controller 22a and supplies (applies) the changed voltage to the third piezoelectric element 81. The voltage supplier 21b supplies a driving signal, in which an AC signal is superimposed on a DC voltage, to the third piezoelectric element 81. The voltage supplier 21b includes a DC power source 211, a switch 212, a voltage changer 213, an AC signal generator 214, a superimposing circuit 215a (AC coupling circuit), a coil 231, and an FB signal receiving circuit 232. In this example, the superimposing circuit of the voltage supplier 21b is different from the superimposing circuit 215 shown in FIG. 7.

The superimposing circuit 215a is, for example, an AC coupling circuit constructed by a capacitor or the like. The superimposing circuit 215a superimposes the AC signal generated from the AC signal generator 214 on the DC voltage supplied from the voltage changer 213 to generate a driving signal. The superimposing circuit 215a outputs the generated driving signal to the output terminal A of the voltage supplier 21b.

The operation of the pressurization controller 20b in this example is the same as the pressurization controller 20a shown in FIG. 7, except for the method used for the superimposing circuit 215a to superimpose the AC signal on the DC voltage to generate the driving signal. The superimposing circuit 215a superimposes the AC signal on the DC voltage by the AC coupling circuit using a capacitor, as described above. Accordingly, the superimposing circuit 215a can more simply superimpose the AC signal on the DC voltage than the superimposing circuit 215 shown in FIG. 7 does.

Third Embodiment

A piezoelectric actuator 1 according to a third embodiment of the present invention will be described below. The piezoelectric actuator 1 according to this embodiment controls the pressure between the rotor 4 and the tip portions 3a during a control cycle of driving the first piezoelectric elements 6 and the second piezoelectric elements 7. The configuration of the piezoelectric actuator 1 according to this embodiment is the same as the second embodiment. The operation of the pressurizing section 8 in the piezoelectric actuator 1 according to this embodiment is different from that in the second embodiment. That is, the operation of the controller 22a is different from that in the second embodiment.

The operation of the piezoelectric actuator 1 in this embodiment will be described below.

Figure 9:
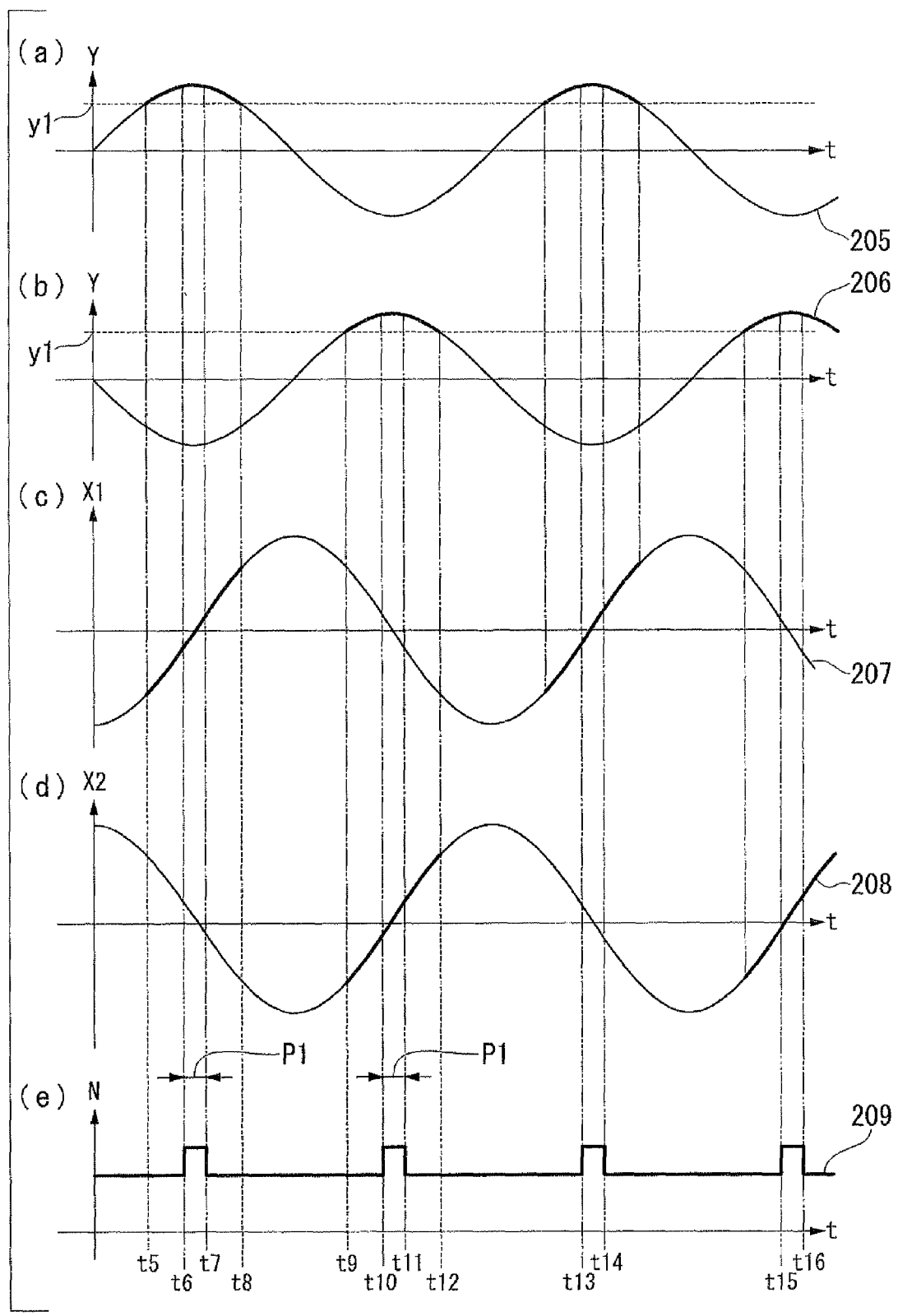
FIG. 9 is a diagram illustrating an example of the operation of a piezoelectric actuator according to a third embodiment of the present invention.

FIG. 9 is diagram illustrating an example of the operation of the piezoelectric actuator 1 in this embodiment.

A part (a) of FIG. 9 shows the displacement in the Y axis direction in the driving members 31 (the tip portions 31a) of the first set (waveform 205), A part (b) of FIG. 9 shows the displacement in the Y axis direction in the driving members 32 (the tip portions 32a) of the second set (waveform 206). Here, the Y axis direction is a direction (the first direction) parallel to the support shaft 5. Here, the upper direction of the first direction in FIG. 1 is the positive direction of the Y axis.

A part (c) of FIG. 9 shows the displacement in the X1 axis direction in the driving members 31 (the tip portions 31a) of the first set (waveform 207). A part (d) of FIG. 9 shows the displacement in the X2 axis direction in the driving members 32 (the tip portions 32a) of the second set (waveform 208). Here, the X1 axis direction and the X2 axis direction are a tangential direction (the second direction) of the rotating circle of the rotor 4 at the centers of the driving members 3. Here, the front side direction of the rotation direction R in FIG. 1 is the positive direction of the X1 axis and the X2 axis.

A part (e) of FIG. 9 shows the pressure (the pressure between the rotor 4 and the tip portions 3a) N on the sliding surface of the rotor 4 (waveform 209).

FIG. 9 shows an example where the phase difference between the voltage waveforms of the sinusoidal waves generated at the first terminal T1 and the second terminal T2 of the power supply 10 is 180°. In this case, as indicated by the waveform 205 and the waveform 206, the displacement to time of the driving members 31 (the tip portions 31a) of the first set and the driving members 32 (the tip portions 32a) of the second set which are driven in the Y axis direction draw sinusoidal loci having a phase difference of 180° (a time difference of a half sine). At this time, the driving members 31 (the tip portions 31a) of the first set come into contact with the rotor 4 when the displacement in the Y axis direction is greater than a contact position y1, as indicated by the solid line (for example, the period from time 15 to time t8) in the waveform 205. The driving members 32 (the tip portions 32a) of the second set similarly come into contact with the rotor 4 as indicated by the solid line (for example, the period from time t9 to time t12) in the waveform 206.

Here, the locus of the driving members 31 of the first set indicated by the waveform 205 and the locus of the driving members 32 of the second set indicated by the waveform 206 have a phase difference of 180°. Accordingly, the driving members 31 (the tip portions 31a) of the first set and the driving members 32 (the tip portions 32a) of the second set alternately come into contact with the rotor 4 and support the rotor 4.

FIG. 9 shows an example where the phase difference between the voltage waveforms of the sinusoidal waves generated at the third terminal T3 and the fourth terminal T4 of the power supply 10 is 180°. In this case, as indicated by the waveform 207 and the waveform 208, the displacement to time of the driving members 31 (the tip portions 31a) of the first set and the displacement to time of the driving members 32 (the tip portions 32a) of the second set which are driven in the X1 axis direction and the X2 axis direction draw sinusoidal loci, respectively.

Here, the driving members 31 (the tip portions 31a) of the first set move in the positive (+) X1 axis direction parallel to the rotation direction of the rotor 4 while they are in contact with the rotor 4 (in the period between the solid lines in the waveform 205), as indicated by the solid lines (for example, the period from time t5 to time t8) in the waveform 207. The driving members 32 (the tip portions 32a) of the second set similarly move in the positive (+) X2 axis direction parallel to the rotation direction of the rotor while they are in contact with the rotor 4 (in the period between the solid lines in the waveform 206), as indicated by the solid lines (for example, the period from time t9 to time t12) in the waveform 208.

As described above, when the driving members 31 (the tip portions 31a) of the first set and the driving members 32 (the tip portions 32a) of the second set are displaced, the pressurization section 8 in this embodiment changes the pressure N on the sliding surface of the rotor 4, as indicated by the waveform 209.

Specifically, in the period from time t5 to time t8, the driving members 31 (the tip portions 31a) of the first set come into contact with the rotor 4 and are displacing in the positive (+) direction of the X1 axis. In the period from time t6 to time t7 within this period (the period in which the displacement rate in the positive (+) direction of the X1 axis is the maximum), the pressurizing section 8 changes the pressure N on the sliding surface of the rotor 4 to be higher.

That is, the controller 22a controls the voltage changer 213 or the AC signal generator 214 and controls the voltage supplier 21 to raise the voltage to be supplied to the third piezoelectric element 81 in the period from time t6 to time t7. The third piezoelectric element 81 increases its thickness in the direction parallel to the support shaft 5 due to the changed voltage from the voltage supplier 21 in the period from time t6 to time t7. Accordingly, the pressurizing section 8 raises the pressure N on the sliding surface of the rotor 4 in the period from time t6 to time t7. That is, when the tip portions 31a vibrate in the positive (+) X1 axis direction (the second direction), the third piezoelectric element 81 changes the pressure N between the rotor 4 and the tip portions 31a to be higher in the period in which the displacement rate of the tip portions 31a is the maximum and in the period in which the rotor 4 and the tip portions 31a are in contact with each other than that in the period in which the rotor 4 and the tip portions 31a do not come in contact with each other.

When the period in which the rotor 4 and the tip portions 31a are in contact with each other is short and the displacement rate in the positive (+) X1 axis direction of the tip portions 31a is the maximum at the time in which the displacement in the Y axis direction of the tip portions 31a is the maximum, the piezoelectric actuator 1 can most efficiently drive the rotor 4. Accordingly, the period (P1) from time t6 to time t7 is set as a period located at the center of the period from time t5 to time t8 so as to satisfy the above-mentioned condition.

In the period from time t13 to time t14, the pressurizing section 8 raises the pressure N on the sliding surface of the rotor 4, similarly to in the period from time t6 to time t7.

In a similar way, in the period from time t9 to time t12, the driving members 32 (the tip portions 32a) of the second set come in contact with the rotor 4 and are displacing in the positive (+) direction of the X2. In the period from time t10 to time t11 within this period (the period in which the displacement rate in the positive (+) direction of the X2 axis is the maximum), the pressurizing section 8 raises the pressure N on the sliding surface of the rotor 4.

That is, the controller 22a controls the voltage changer 213 or the AC signal generator 214 and controls the voltage supplier 21 to raise the voltage to be supplied to the third piezoelectric element 81 in the period from time t10 to time t11. The third piezoelectric element 81 increases its thickness in the direction parallel to the support shaft 5 due to the changed voltage from the voltage supplier 21 in the period from time t10 to time t11. Accordingly, the pressurizing section 8 raises the pressure N on the sliding surface of the rotor 4 in the period from time t10 to time t11. That is, when the tip portions 32a vibrate in the positive (+) X2 axis direction (the second direction), the third piezoelectric element 81 changes the pressure N between the rotor 4 and the tip portions 32a to be higher in the period in which the displacement rate of the tip portions 32a is the maximum and in the period in which the rotor 4 and the tip portions 32a are in contact with each other than that in the period in which the rotor 4 and the tip portions 32a do not come in contact with each other.

When the period in which the rotor 4 and the tip portions 32a are in contact with each other is short and the displacement rate in the positive (+) X2 axis direction of the tip portions 32a is the maximum at the time in which the displacement in the Y axis direction of the tip portions 32a is the maximum, the piezoelectric actuator 1 can most efficiently drive the rotor 4. Accordingly, the period (P1) from time t10 to time til is set as a period located at the center of the period from time t9 to time t12 so as to satisfy the above-mentioned condition.

In the period from time t15 to time t16, the pressurizing section 8 raises the pressure N on the sliding surface of the rotor 4, similarly to in the period from time t10 to time tn.

As described above, in the piezoelectric actuator 1 according to this embodiment, when the tip portions 3a vibrate in the X1 axis direction or the X2 axis direction (the second direction), the third piezoelectric element 81 changes the pressure N between the rotor 4 and the tip portions 3a to be higher in the period in which the displacement rate of the tip portions 3a is the maximum and in the period in which the rotor 4 and the tip portions 3a are in contact with each other than that in the other period. Accordingly, the piezoelectric actuator 1 according to this embodiment can cause the rotor 4 to more efficiently rotate than ever before.

An example of a lens barrel and a camera (the imaging device) having the piezoelectric actuator 1 according to this embodiment will be described below. The lens barrel (an interchangeable lens) in this embodiment constitutes a camera system and a camera body. The interchangeable lens can be switched between an AF (Auto Focus) mode in which a focusing operation is performed under the known AF control and an MF (Manual Focus) mode in which the focusing operation is performed in accordance with a photographer's manual input.

Figure 10:
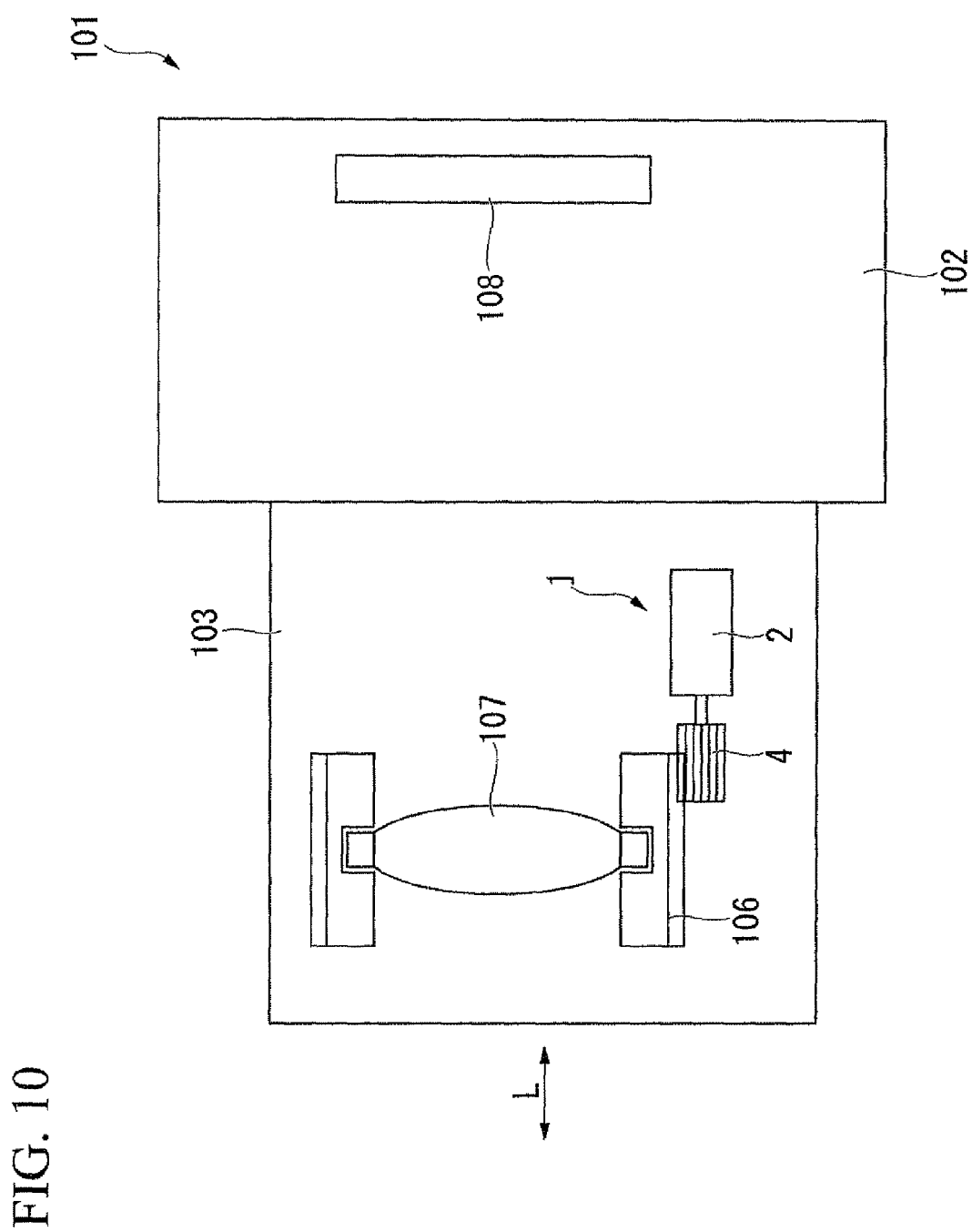
FIG. 10 is a diagram schematically illustrating the configuration of a lens barrel and an imaging device according to another embodiment of the present invention.

FIG. 10 is a diagram schematically illustrating the configuration of a lens barrel 103 and a camera 101 according to another embodiment of the present invention.

As shown in FIG. 10, the camera 101 (the imaging device) includes a camera body 102 having an imaging element 108 built therein and a lens barrel 103 having a lens 107.

The lens barrel 103 is an interchangeable lens that can be attached to and detached from the camera body 102. The lens barrel 103 includes a lens 107, a cam box 106, and a piezoelectric actuator 1. The piezoelectric actuator 1 is used as a drive source driving the lens 107 in the focusing operation of the camera 101. The driving force acquired from the rotor 4 of the piezoelectric actuator 1 is transmitted directly to the cam box 106. The lens 107 is supported by the can box 106 and is a focusing lens that moves substantially in parallel to the optical axis direction L to adjust the focus by the use of the driving force of the piezoelectric actuator 1.

At the time of using the camera 101, a subject image is formed on the imaging plane of the imaging element 108 through the use of a lens group (including the lens 107) disposed in the lens barrel 103. The formed subject image is converted into an electrical signal by the imaging element 108 and an image data is acquired by A/D converting the electric signal.

As described above, the camera 101 and the lens barrel 103 include the above-mentioned piezoelectric actuator 1. Accordingly, it is possible to cause the rotor 4 to more efficiently rotate and to efficiently drive the lens 107 than ever before.

Although it has been stated in this embodiment that the lens barrel 103 is an interchangeable lens, the present invention is not limited to this example and the lens barrel may be a lens barrel integrated with the camera body.

The present invention is not limited to the above-mentioned embodiments, but may be modified in various forms without departing from the concept of the present invention. The present invention may individually put any one of the first to third embodiments into practice or may put a combination thereof into practice.

In the above-mentioned embodiments, the first piezoelectric elements 6 and the second piezoelectric elements 7 may be deformed in the thickness direction instead of being deformed in the thickness-shear mode. In this case, it is possible obtain the same advantages as using the piezoelectric elements deforming in the thickness-shear mode.

In the above-mentioned embodiments, the third piezoelectric element 81 may be a stacked piezoelectric element. The stacked piezoelectric element can enhance the variation in thickness with the application of a voltage. Accordingly, when the stacked piezoelectric element is used, the pressurizing section 8 can widen the pressure range in which the pressure can be changed by the third piezoelectric element 81. Although it has been stated that the first piezoelectric elements 6, the second piezoelectric elements 7, and the third piezoelectric element 81 are formed of a material containing piezoelectric zirconate titanate, other materials not containing piezoelectric zirconate titanate may be used.

In the above-mentioned embodiments, the pressurizing section 8 may or may not include an elastic member such as a spring member. When the elastic member such as a spring member is included, it is not necessary to apply a voltage to the third piezoelectric element 81 in the case where the rotor 4 is changed to the locked state when the rotor 4 is in the in-stop state. Accordingly, in the case where the rotor 4 is changed to the locked state when the rotor 4 is in the in-stop state, it is possible to reduce the power consumption. Although it has been stated that the pressurizing section 8 includes the rubber member 82, the rubber member 82 may not be provided.

In the case where the rotor 4 is changed to the locked state when the rotor 4 is in the in-stop state, a mechanical clamp that mechanically clamps and locks the rotor 4 may be provided. The mechanical clamp may have a configuration in which a mechanism such as a knock type ballpoint pen is disposed coaxial with the support shaft 5 to mechanically lock when the rotor 4 is in the in-stop state. The mechanical clamp may have a configuration of locking the rotor by a solenoid or an external pressing.

Although it has been stated in the second embodiment that the pressure is detected by the use of the coil 231, a hall element or the like may be used. Although it has been stated that the third piezoelectric element 81 is used as a sensor at the time of detecting the pressure, a sensor detecting the pressure may be provided independently.

Although it has been stated in the second embodiment that the AC signal is superimposed on the DC voltage by the use of the adder circuit using an operational amplifier or the AC coupling circuit, they may be superimposed using other methods.

Although the third embodiment employs the configuration of the second embodiment, any configuration may be employed as long as the pressure N on the sliding surface of the rotor 4 can be raised as shown in the part (e) of FIG. 9. For example, when the pressure can be changed as shown in the part (e) of FIG. 9 by the use of the voltage changer 213, the configuration of the first embodiment may be employed.

In the above-mentioned embodiments, the constituent elements of the pressurization controller 20 may be embodied by dedicated hardware, or the controller 22 (or 22a) may include a memory and a CPU and the functions of the controller 22 (or 22a) may be realized by programs.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

In the above-mentioned embodiments, the number of the driving members 3 is two sets of three for a total of six and the driving members 3 of the first sets are alternatively disposed with the driving members 3 of the second sets has been described, but the present invention is not limited to this. For example, the number of the driving members 3 may be three sets of two for a total six, four sets of four for a total of sixteen, or the like. In addition, multiples, such as pairs, of the driving members 3 of one of sets may be alternatively disposed with multiples, such as pairs, of the driving members 3 of the other sets. In this manner, the total number of the driving members 3, the number of the sets, the disposing pattern, and the like may be varied. At this time, the number of the output terminal of the power supply 10, the phase difference of the voltage waveform of the sinusoidal wave which is to be generated, and the like may be varied depending on the total number of the driving members 3, the number of the sets, the disposing pattern, and the like.

What is claimed is:

1. A piezoelectric actuator comprising:
   a first piezoelectric element that performs thickness-shear vibration in a first direction;
   a first member that is driven by the first piezoelectric element and that vibrates in the first direction;
   a second piezoelectric element that is supported by the first member and that performs thickness-shear vibration in a second direction;
   a second member that is driven by the second piezoelectric element and that vibrates in the second direction; and
   a pressurizing section that generates a pressure between the second member and a driving target member driven by the second member,
   wherein the pressurizing section changes the pressure via a third piezoelectric element that deforms corresponding to a driving state of the driving target member.

2. The piezoelectric actuator according to claim 1, wherein the third piezoelectric element deforms to make the pressure lower in the driving state where the speed of the driving target member in drive is relatively higher than in the driving state where the speed of the driving target member is relatively lower.

3. The piezoelectric actuator according to claim 1, wherein the third piezoelectric element deforms to make the pressure lower in the driving state where the speed of the driving target member is highest than in the driving state where the driving of the driving target member is started or stopped.

4. The piezoelectric actuator according to claim 1, wherein when the second member vibrates in the second direction, the third piezoelectric element deforms to make the pressure higher in a period of time in which the speed of the second member is highest and a period of time in which the second member comes in contact with the driving target member than in the other period.

5. The piezoelectric actuator according to claim 1, wherein when the driving target member is substantially freely movable in the second direction, the third piezoelectric element deforms to make a frictional force between the driving target member and the second member substantially 0.

6. The piezoelectric actuator according to claim 1, further comprising a control unit that changes a voltage applied to the third piezoelectric element to control the pressure.

7. The piezoelectric actuator according to claim 6, further comprising:
   a voltage supply unit that supplies the third piezoelectric element with a driving signal in which an AC signal is superimposed on a DC voltage; and
   a detection unit that detects the pressure,
   wherein the control unit changes the driving signal in the voltage supply unit on the basis of the pressure detected by the detection unit.

8. The piezoelectric actuator according to claim 7, wherein the detection unit detects the pressure on the basis of an electromotive force generated based on the pressure in the third piezoelectric element.

9. The piezoelectric actuator according to claim 1, wherein the pressurizing section includes an elastic member that generates the pressure in addition to the third piezoelectric element.

10. The piezoelectric actuator according to claim 1, wherein the third piezoelectric element is a stacked piezoelectric element.

11. A lens barrel comprising the piezoelectric actuator according to claim 1.

12. An imaging device comprising the piezoelectric actuator according to claim 1.

* * * * *